US006590028B1

(12) United States Patent
Probst et al.

(10) Patent No.: US 6,590,028 B1
(45) Date of Patent: Jul. 8, 2003

(54) AQUEOUS TWO-COMPONENT POLYURETHANE SYSTEMS WITH INCREASED IMPACT RESISTANCE, HIGH STABILITY AND GOOD OPTICAL PROPERTIES, METHOD FOR PRODUCING SAME AND THEIR USE

(75) Inventors: Joachim Probst, Leverkusen (DE); Ulrich Biskup, Leverkusen (DE); Claus Kobusch, Shanghai (CN); Christoph Irle, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/868,207

(22) PCT Filed: Dec. 6, 1999

(86) PCT No.: PCT/EP99/09522

§ 371 (c)(1),
(2), (4) Date: Jun. 13, 2001

(87) PCT Pub. No.: WO00/37521

PCT Pub. Date: Jun. 29, 2000

(30) Foreign Application Priority Data

Dec. 18, 1998 (DE) ........................................ 198 58 732

(51) Int. Cl.[7] ............................ C08J 3/00; C08K 3/20; C08L 75/00; C08F 8/30; C08F 283/04

(52) U.S. Cl. ....................... 524/589; 524/591; 524/839; 524/840; 524/507; 525/123; 525/127; 525/128; 525/455

(58) Field of Search ................................ 524/507, 591, 524/839, 840, 589; 525/123, 128, 127, 455

(56) References Cited

U.S. PATENT DOCUMENTS

| | | | | |
|---|---|---|---|---|
| 5,075,370 A | 12/1991 | Kubitza et al. | ............. | 524/591 |
| 5,670,600 A | 9/1997 | Nienhaus et al. | ............. | 528/75 |

FOREIGN PATENT DOCUMENTS

| | | |
|---|---|---|
| EP | 557 844 | 9/1993 |
| EP | 842 991 | 5/1998 |
| EP | 842991 A1 * | 5/1998 |

* cited by examiner

*Primary Examiner*—Patrick D. Niland
(74) *Attorney, Agent, or Firm*—Joseph C. Gil; Thomas W. Roy

(57) ABSTRACT

The invention relates to aqueous two-component polyurethane systems, a process for their production, and their use for the production of coatings having increased impact strength, high stability properties and outstanding optical properties.

11 Claims, No Drawings

AQUEOUS TWO-COMPONENT POLYURETHANE SYSTEMS WITH INCREASED IMPACT RESISTANCE, HIGH STABILITY AND GOOD OPTICAL PROPERTIES, METHOD FOR PRODUCING SAME AND THEIR USE

BACKGROUND OF THE INVENTION

The invention relates to aqueous two-component polyurethane systems, a process for their production, and their use for the production of coatings having increased impact strength, high stability properties and outstanding optical properties.

Ecological issues play a significant role in surface technology. One particularly urgent problem is the reduction of the amounts of organic solvents used for lacquers and coating materials.

From EP-A 358 979 it is known that where use is made of selected polyhydroxyl compounds based on vinyl polymer by way of reaction partners for organic polyisocyanates with free isocyanate groups aqueous two-component polyurethane systems can be produced by the polyisocyanates with free isocyanurate groups being emulsified in the aqueous polymer solution or dispersion. The polyhydroxyl compounds described in EP-A 0 358 979 are preferably radically polymerised in organic solution and then transferred immediately into the aqueous solution of a neutralising agent—usually ammonia or tertiary amines—and dissolved in water. In this case the organic solvent may remain in the aqueous medium or be removed by distillation, as required.

The polymer polyols produced in this manner normally have monophase morphology—that is to say, they exhibit either thermoplastic or elastomeric properties also after crosslinking and formation of films with suitable hydrophobic and/or hydrophilised polyisocyanates. With a view to the production of polyurethane films having the properties of a thermoplastic elastomer that possesses both excellent toughness properties and a high level of strength, a monophase structure of such a polymer polyol is generally insufficient.

It has been shown that only polymer-polyol systems of biphase or multiphase structure in combination with suitable polyisocyanates result in polyurethane coatings with a high level of toughness, particularly at low temperatures.

SUMMARY OF THE INVENTION

The invention therefore provides two-component polyurethane coating agents that contain by way of binding-agent component a) a graft polymer consisting of at least two polyol components, the first being linked covalently or adsorptively as an elastic component a1) with a second thermoplastic component a2), and a polyisocyanate component b) with a viscosity of at the most 10,000 mPa·s, consisting of at least one organic polyisocyanate in quantities corresponding to an NCO/OH equivalent ratio from 0.2:1 to 5:1, characterised in that component a) is represented by an aqueous solution and/or dispersion of the aforementioned graft polymer, in which the polyisocyanate component b) is present in emulsified or solubilised form.

DETAILED DESCRIPTION OF THE INVENTION

Component a) comprises a polyol component that consists of at least two covalently or adsorptively linked polyol phases a1) as elastomer constituent and a2) as thermoplastic constituent based on vinyl polymer.

In this connection the elastomer constituent a1) may serve as graft base, onto which the thermoplastic constituent a2) has been radically grafted, and the thermoplastic constituent a2) may equally serve as graft base, onto which the elastomer constituent a1) has been grafted.

Polyol constituent a1) comprises an elastomer component that contains hydroxyl groups, sulfonate and/or carboxylate groups, preferably carboxylate groups, and optionally sulfonic-acid and/or carboxyl groups, preferably carboxyl groups. Component a1) comprises polymers of olefinically unsaturated monomers which preferably have a hydroxyl-number from 8 to 264, preferably 16 to 198 mg KOH/g solid resin, an acid-number (relative to the sum of the non-neutralised and neutralised acid groups) from 0 to 100, preferably 3 to 50 mg KOH/g solid resin. The elastomer component a1) has a glass temperature (measured by the DSC or DMA method) of at most 0° C., preferably at most −10° C.

The thermoplastic constituent a2) is likewise a polyol component that contains hydroxyl groups, sulfonate and/or carboxylate groups, preferably carboxylate groups, and optionally sulfonic-acid and/or carboxyl groups, preferably carboxyl groups. Component a2) is likewise a polymer of olefinically unsaturated monomers that have a hydroxyl-number from 16 to 264, preferably 33 to 198 mg KOH/g solid resin, an acid-number (relative to the sum of the non-neutralised and neutralised acid groups) from 3 to 100, preferably 5 to 50 mg KOH/g solid resin. The thermoplastic component a2) has a glass temperature of at least 0° C., preferably at least +10° C.

Quite particularly preferred are elastomer components a1) that are constructed from the following comonomer components:

a1 a) 0.4–7.7 wt.-% acrylic acid and/or methacrylic acid;

a1 b) 3.4–50.8 wt.-% acrylic 2-hydroxyethylester and/or acrylic hydroxy-propyl-ester and/or methacrylic 2-hydroxyethylester and/or methacrylic hydroxypropylester;

a1 c) 0–20 wt.-% methacrylic methylester and/or acrylonitrile and/or methacrylonitrile and/or styrene or substituted styrenes as comonomers with a character imparting strength and hardness;

a1 d) 70–96 wt.-% methacrylic alkylester with 2 to 12 C atoms in the alkyl residue and/or acrylic alkylester with 1 to 12 C atoms in the alkyl residue as elasticising components;

a1 e) 0–5 wt.-% crosslinking comonomers such as, for example, divinyl-benzene, ethylene glycol di(meth)acrylate, propylene glycol di(meth)acrylate, butylene glycol di(meth)acrylate, allyl(meth)acrylate, where the wt.-% of a1 a) to a1 e) sum to 100 and where the glass temperature lies below −10° C.

Quite particularly preferred are thermoplastic components a) that are constructed from the following comonomer components:

a2 a) 0.6–7.7 wt.-% acrylic acid and/or methacrylic acid;

a2 b) 6.8–50.8 wt.-% acrylic 2-hydroxyethylester and/or acrylic hydroxypropyl-ester and/or methacrylic 2-hydroxyethylester and/or methacrylic hydroxypropylester;

a2 c) 30–80 wt.-% methacrylic methylester and/or acrylonitrile and/or methacrylonitrile and/or styrene or substituted styrenes as comonomers with a character imparting strength and hardness;

a2 d) 5–40 wt.-% methacrylic alkylester with 2 to 12 C atoms in the alkyl residue and/or acrylic alkylester with 1 to 12 C atoms in the alkyl residue as elasticising components;

a2 e) 0–5 wt.-% crosslinking comonomers such as, for example, divinyl-benzene, ethylene glycol di(meth) acrylate, propylene glycol di(meth)acrylate, butylene glycol di(meth)acrylate, allyl(meth)acrylate, where the wt.-% of a2 a) to a2 e) sum to 100 and where the glass temperature lies above +10° C.

Elastomer component a1) and thermoplastic component a2) are preferably grafted in weight ratios from 10:90 to 60:40 (with respect to solid resin).

The invention also provides a process for the production of a two-component polyurethane coating agent that contains by way of binding-agent component a) a graft polymer consisting of at least two polyol components, the first being linked covalently or adsorptively as an elastic component a1) with a second thermoplastic component a2), and a polyisocyanate component b) with a viscosity of at the most 10,000 mPa·s, consisting of at least one organic polyisocyanate in quantities corresponding to an NCO/OH equivalent ratio from 0.2:1 to 5:1, characterised in that component a) is represented by an aqueous solution and/or dispersion of the aforementioned graft polymer, in which the polyisocyanate component b) is present in emulsified or solubilised form.

Production of the polymer component a) comprising hydroxyl groups is effected by processes, known as such, of radical polymerisation in organic phase or in aqueous phase. Production of the polymers is preferably effected in the one-pot process by the method of radical emulsion polymerisation in the aqueous medium.

Firstly, either the elastomer component a1) or the thermoplastic component a2) is produced by way of graft base, and subsequently the thermoplastic component a2) or the elastomer component a1), respectively, is grafted on radically.

Possible are continuous or discontinuous polymerisation processes. Of the continuous processes, mention may be made of the batch process and the inflow process, the latter being preferred. In the case of the inflow process, water is submitted alone or with a portion of an anionic emulsifier, optionally with admixture of a non-ionic emulsifier, and also with a portion of the monomer mixture a1) or a2), is heated to the polymerisation temperature, polymerisation is started radically in the case of an initial monomer submission and the remaining monomer mixture is charged together with an initiator mixture and the emulsifier in the course of 0.5 to 10 hours, preferably 1 to 6 hours. The polymer dispersion produced in this way functions as graft base in this case, onto which either the thermoplastic phase a2) or the elastomer phase a1) is radically grafted in a second inflow stage (0.5 to 10 hours). Optionally, re-activation is subsequently effected with further initiator, in order to carry out polymerisation until a conversion of at least 99% has been obtained.

In this case a latex system is formed which generally contains partially grafted latex systems in a blend with the original, ungrafted graft base and elastomer particles a1) or thermoplastic particles a2) that have not been grafted on. In the ideal case the particles of this latex system have a core/shell morphology.

The emulsifiers employed in the course of the polymerisation are of anionic and/or non-ionic nature. Of the emulsifiers of anionic nature, those with carboxylate groups, sulfate, sulfonate, phosphate or phosphonate groups may be employed. Preferred are emulsifiers with sulfate, sulfonate, phosphate or phosphonate groups. The emulsifiers may be low-molecular or high-molecular. The latter are described in, for example, DE-A 3 806 066 and DE-A 1 953 349.

Preferred are anionic emulsifiers that have been neutralised with ammonia or with amines. Particularly preferred are emulsifiers that are constructed from long-chain alcohols or substituted phenols as well as ethylene-oxide chains with degrees of polymerisation between 2 and 100 and with terminating monosulfuric-ester group or phosphoric-monoester and phosphoric-diester groups. Use is generally made of ammonia by way of neutralising agent in this case. They may be added to the emulsion formulation individually or in arbitrary mixtures.

Suitable non-ionic emulsifiers which can usually be employed in combination with the aforementioned anionic emulsifiers are reaction products of aliphatic, araliphatic, cycloaliphatic or aromatic carboxylic acids, alcohols, phenol derivatives or amines with epoxides such as, for example, ethylene oxide. Examples of these are reaction products of ethylene oxide with carboxylic acids such as, for example, lauric acid, stearic acid, oleic acid, the carboxylic acids of castor oil, abietic acid, with longer-chain alcohols such as oleyl alcohol, lauryl alcohol, stearyl alcohol, with phenol derivatives such as, for example, substituted benzylphenols, phenylphenols, nonylphenol and with longer-chain amines such as, for example, dodecylamine and stearylamine. The products of reaction with ethylene oxide are constituted by oligoethers or polyethers with degrees of polymerisation between 2 and 100, preferably from 5 to 50. These emulsifiers are added in quantities from 0.1 to 10 wt.-%, relative to the mixture of the monomers.

Both water-soluble and water-insoluble solvents come into consideration by way of cosolvents which are optionally to be used concomitantly. Examples of such cosolvents which come into consideration are aromatic substances such as benzene, toluene, xylene, chlorobenzene, esters such as ethyl acetate, butyl acetate, ether esters such as methyl glycol acetate, ethyl glycol acetate, methoxypropyl acetate, methoxybutyl acetate, ethers such as butyl glycol, tetrahydrofuran, dioxan, ethyl glycol ether, ethers of diglycol, ethers of dipropylene glycol, ketones such as acetone, methyl ethyl ketone, methyl isobutyl ketone, trichloromonofluoroethane, cyclic amides such as N-methylpyrrolidone or N-methylcaprolactam.

The polymerisation which is initiated by radicals can be triggered by water-soluble or water-insoluble initiators or initiator systems, the half-lives of radical decay of which at temperatures from 10° C. to 100° C. amount to between 0.01 and 400 min. In general, polymerisation is effected in aqueous emulsion within the stated temperature range, preferably between 30 and 90° C., under a pressure from $10^3$ to $2\times10^4$ mbar, with the precise polymerisation temperature conforming to the type of the initiator. The initiators are generally employed in quantities from 0.05 to 6 wt.-%, relative to the total quantity of monomers.

Suitable initiators are, for example, water-soluble and water-insoluble azo compounds such as azo-isobutyrodinitrile or 4,4'-azo-bis-(4-cyanopentanoic acid) as well as inorganic and organic peroxides such as, for example, dibenzoyl peroxide, t-butyl perpivalate, t-butyl-per-2-ethylhexanoate, t-butyl perbenzoate, t-butyl hydroperoxide, di-t-butyl peroxide, cumene hydroperoxide, dicyclohexyl and dibenzyl peroxydicarbonate as well as the sodium, potassium or ammonium salts of peroxodisulfuric acid and hydrogen peroxide. The peroxodisulfates and hydrogen peroxides are often employed in combination with reducing agents such as, for example, the sodium salt of formamidinosulfinic acid (Rongalit C), ascorbic acid or polyalkylene polyamines. In general, a distinct lowering of the polymerisation temperature is achieved by this means.

With a view to regulating the molecular weight of the polymers, conventional regulators may be employed such as, for example, n-dodecylmercaptan, t-dodecylmercaptan, diisopropylxanthogen disulfide di(methylenetrimethylolpropane)-xanthogen disulfide and thioglycol. Similarly, the use of allylic compounds such as, for example, the dimer of α-methylstyrene is possible. They are added in quantities of at most 3 wt.-%, relative to the monomer mixture.

After polymerisation has been concluded, the polymers which are present in aqueous dispersion are optionally mixed with neutralising agent until degrees of neutralisation from 10 to 150% (by calculation), preferably 30 to 100%, are attained. To this end, inorganic bases, ammonia or amines are added by way of neutralising agent. By way of inorganic bases, use may be made, for example, of sodium hydroxide, potassium hydroxide; by way of amines, besides ammonia, trimethylamine, triethylamine, dimethylethanolamine, methyldiethanolamine, triethanolamine, etc. The neutralising agents may be employed both in stoichiometric deficiency and in stoichiometric excess.

However, particularly in the case where use is made of a stoichiometric excess of neutralising agent, care is to be taken to ensure that a distinct increase in viscosity can occur by virtue of the polyelectrolyte character of the polymers.

Any cosolvents which are possibly added may remain in the aqueous dispersion in quantities up to about 20 wt.-%, relative to the aqueous phase. But the cosolvents may, as required, also be removed by distillation subsequent to the polymerisation.

The polymer dispersions a) which consist of the soft phase a1) and the hard phase a2) generally possess solid contents from 20 to 60 wt.-%, preferably 30 to 50 wt.-%, and viscosities from 10 to 100,000, preferably 10 to 10,000 mPa·s at 23° C., and pH values from 5 to 10, preferably 6 to 9. The weight ratio of soft phase a1) to the hard phase a2) preferably amounts to between 10:90 and 60:40 (a1:a2).

The average particle diameters in the dispersion (measured by means of laser correlation spectroscopy) generally amount to between 50 and 500 nm, preferably from 80 to 200 nm.

Polyisocyanate component b) may be constituted by any organic polyisocyanates with aliphatically, cycloaliphatically, araliphatically and/or aromatically bound, free isocyanate groups that are liquid at room temperature. Polyisocyanate component b) generally has a viscosity at 23° C. of at the most 10,000, preferably of at the most 1,000 mPa·s. Polyisocyanate component b) is constituted in particularly preferred manner by polyisocyanates or polyisocyanate mixtures with exclusively aliphatically and/or cycloaliphatically bound isocyanate groups with an (average) NCO functionality between 2.2 and 5.0 and with a viscosity at 23° C. of at the most 500 mPa·s.

The polyisocyanates may optionally be used in a blend with small quantities of inert solvents, in order to lower the viscosity to a value within the stated ranges. The quantity of such solvents is such that up to 20 wt.-% solvent is present, relative to the quantity of water, in the coating agents according to the invention which are ultimately obtained, whereby the solvent which is optionally still present in the polymer dispersions or solutions also enters into the calculation. Solvents that are suitable as addition agents for the polyisocyanates are, for example, aromatic hydrocarbons such as, for example, "solvent naphtha" or also solvents of the type stated above by way of examples.

Polyisocyanates that are suitable as component b) are, in particular, the so-called "lacquer polyisocyanates" with aromatically or (cyclo)aliphatically bound isocyanate groups, whereby, as already explained, the last-mentioned aliphatic polyisocyanates are particularly preferred.

Quite particularly preferred are polyisocyanates of (partially) hydrophilised character.

Very well suited are, for example, "lacquer polyisocyanates" based on hexamethylene diisocyanate or on 1-isocyanato-3,3,5-trimethyl-5-isocyanatomethyl-cyclohexane (IPDI) and/or bis-(isocyanatocyclohexyl)-methane, in particular those based exclusively on hexamethylene diisocyanate.

"Lacquer polyisocyanates" based on these diisocyanates are to be understood to be the derivatives of these diisocyanates, known as such, comprising biuret, urethane, uretdione and/or isocyanurate groups, which subsequent to their production have been freed in known manner, preferably by distillation, of excess initial diisocyanate, except for a residual content amounting to less than 0.5 wt.-%. The preferred aliphatic polyisocyanates to be used in accordance with the invention include polyisocyanates comprising biuret groups conforming to the aforementioned criteria and based on hexamethylene diisocyanate, such as can be obtained, for example, by the processes disclosed in U.S. Pat. Nos. 3,124,605, 3,358,010, 3,903,126, 3,903,127 or 3,976,622, and which consist of mixtures of N,N',N"-tris-(6-isocyanatohexyl)-biuret with subordinate quantities of its higher homologues, as well as the cyclic trimers of hexamethylene diisocyanate conforming to the stated criteria, such as can be obtained in accordance with U.S. Pat. No. 4,324,879, and which consist substantially of N,N',N"-tris-(6-isocyanatohexyl)-isocyanurate in a mixture with subordinate quantities of its higher homologues. Particularly preferred are mixtures conforming to the stated criteria and consisting of polyisocyanates comprising uretdione and/or isocyanurate groups and based on hexamethylene diisocyanate, such as arise as a result of catalytic oligomerisation of hexamethylene diisocyanate by using trialkyl phosphines. Particularly preferred are the last-named mixtures with a viscosity at 23° C. of at the most 500 mPa·s and with an NCO functionality amounting to between 2.2and5.0.

The aromatic polyisocyanates that are likewise suitable in accordance with the invention but less preferred are constituted in particular by "lacquer polyisocyanates" based on 2,4-diisocyanatotoluene or the technical mixtures thereof with 2,6-diisocyanatotoluene or based on 4,4'-diisocyanatodiphenylmethane or the mixtures thereof with its isomers and/or higher homologues. Aromatic lacquer poly-isocyanates of this type are, for example, the isocyanates comprising urethane groups, such as are obtained by reaction of excess quantities of 2,4-diisocyanatotoluene with polyhydric alcohols such as triomethylolpropane and subsequent removal of the non-converted diisocyanate excess by distillation. Further aromatic lacquer polyisocyanates are, for example, the trimers of the monomeric diisocyanates named by way of examples—that is to say, the corresponding isocyanato-isocyanurates which subsequent to their production have likewise been freed, preferably by distillation, of excess monomeric diisocyanates.

Any water-dispersible polyisocyanates with aliphatically, cycloaliphatically, araliphatically and/or aromatically bound isocyanate groups may be used by way of particularly preferred crosslinker component for the binding-agent dispersions according to the invention.

Suitable are, for example, ionic modified polyisocyanates containing, for example, carboxylate groups and optionally polyether units, of the type stated in EP-A 510 438 and EP-A 548 669, polyisocyanates containing sulfonate groups, of the type stated in EP-A 703 255, or polyisocyanates containing phosphate or phosphonate groups, such as are described in WO 97/31960.

By way of crosslinker components for the binding-agent dispersions according to the invention, however, purely non-ionic polyisocyanates that have been hydrophilically modified by reaction with polyethylene-oxide polyether alcohols preferably find application. Such polyisocyanates are known, for example, from EP-A 206 059, EP-A 516 277, EP-B 540 985, EP-A 645 410, EP-A 680 983, U.S. Pat. No. 5,200,489 or from German Patent Application 19822891.0. Non-ionically hydrophilised polyisocyanates that are likewise suitable are the polyisocyanate preparations named in EP-B 486 881 containing special emulsifiers consisting of diisocyanates and monofunctional polyether alcohols.

Particularly preferred water-dispersible polyisocyanates are the aforementioned polyisocyanates that have been hydrophilically modified with the aid of polyethylene-oxide polyether alcohols with isocyanate groups that are exclusively bound aliphatically and/or cycloaliphatically. Quite particularly preferred are water-dispersible polyisocyanates of the stated type with uretdione and/or isocyanurate structure based on 1,6-diisocyanatohexane (HDI), 1-isocyanato-3,5,5-trimethyl-5-isocyanatomethyl-cyclohexane (isophorone diisocyanate IPDI), and/or 4,4'-diisocyanatodicyclohexyl-methane.

Polyisocyanate component b) may otherwise consist of any mixtures of the polyisocyanates named by way of examples.

With a view to producing the ready-to-use coating agents, polyisocyanate component b) is emulsified in the aqueous dispersion of the polymer a), wherein the dissolved or dispersed polymer simultaneously takes over the function of an emulsifier or of the reactive component for the added polyisocyanate.

Intermixing may be effected by simple stirring at room temperature. The quantity of the polyisocyanate component in this case is such as to result in an NCO/OH equivalent ratio, relative to the isocyanate groups of component b) and the alcoholic hydroxyl groups of component a), of 0.2:1 to 5:1, preferably 0.5:1 to 2:1. Prior to the addition of the polyisocyanate component b) the conventional auxiliary substances and additives of lacquer technology may be incorporated into the polymer component a)—that is to say, into the dispersion or solution of the polymers. These include, for example, defoaming agents, flow-control agents, pigments, dispersing agents for the distribution of pigment, and such like.

In the course of the crosslinking of the polyol components according to the invention with the polyisocyanates an extensive fixing of the elastomeric and the thermoplastic phases takes place, as a result of which too extensive an intermixing is prevented. This is demonstrated in the Examples on the basis of the separately detectable glass temperatures.

The invention further provides the use of the coating agents according to the invention. They are suitable for practically all fields of application in which solvent-containing, solvent-free or different aqueous painting and coating systems having an increased profile of properties find application; for example, coating of mineral building-material surfaces such as lime-bound and/or cement-bound plasters, surfaces containing gypsum, fibre-cement building materials, concrete; lacquering and sealing of wood and timber materials such as chipboards, wood-fibre boards as well as paper; lacquering and coating of metallic surfaces; coating and lacquering of road-surfacings containing asphalt and bitumen; lacquering and sealing of various plastic surfaces; coating of leather and textiles; in addition they are suitable for the planar agglutination of various materials, whereby similar and different materials are connected to one another.

The coating of plastic surfaces is particularly preferred. In this case, coating systems are demanded having increased impact strength even at low temperatures (down to −20° C.) and simultaneously having good resistance to solutions and chemicals. The optical properties (gloss, resin value, etc) of such two-component coatings are outstanding, as can be discerned in the application examples.

The hardening or crosslinking of the two-component system may be effected after application on the respective substrate at temperatures from 5 to 300° C., preferably between room temperature and 200° C.

In the following examples all percentage figures refer to percentages by weight.

Production of Graft Polymers (Thermoplastic Component as Graf Base) in the One-pot Process

EXAMPLES A AND B

In a 3-1 stirred-tank reactor with effective stirrer, reflux condenser as well as gas inlet and gas outlet the initial submissions I (cf. Table 1) are submitted and flushed with nitrogen. Subsequently nitrogen is passed over in a steady stream and the initial submission is heated to 80° C. with stirring at about 120 rpm. Subsequently the monomer mixtures II specified in Table 1 and the initiator solutions III are added very quickly. After a reaction time of 30 minutes the inflow of the monomer mixtures IV and of the initiator solutions V is started; IV is uniformly metered in in 2 h, V in 4 h. After the inflow of the monomer mixtures IV has been completed, the inflow of the monomer mixtures VI is begun; VI is uniformly metered in in 2 h. Subsequently the monomer mixtures VII and the initiator solutions VIII are uniformly metered in 1 h. Then further stirring is effected for 1 h and re-activation is effected with IX. After this, further stirring is effected for 4 h and cooling to room temperature takes place. Neutralisation is effected with the solutions X. Subsequently the dispersions are filtered and drawn off.

The physicochemical characteristic data relating to the aqueous polymer dispersions are likewise listed in Table 1.

TABLE 1

| | A | B |
|---|---|---|
| I. Initial submission | | |
| Emulsifier A (80%) | 12.5 g | 12.5 g |
| de-ionised water | 500 g | 700 g |
| II. Monomer mixture (batch phase) | | |
| methacrylic hydroxypropylester | 8 g | 8 g |
| methacrylic methylester | 90 g | 90 g |
| III. Initiator solution (batch phase) | | |
| ammonium peroxodisulfate | 0.5 g | 0.5 g |
| de-ionised water | 25 g | 25 g |
| IV. Monomer mixture (inflow 1) | | |
| methacrylic hydroxypropylester | 37 g | 37 g |
| methacrylic methylester | 404 g | 404 g |
| V. Initiator/solution (inflow 1) | | |
| ammonium/peroxodisulfate | 3 g | 3 g |
| Emulsifier A (80%) | 12.5 g | 12.5 g |
| de-ionised water | 600 g | 600 g |

TABLE 1-continued

| | A | B |
|---|---|---|
| VI. Monomer mixture (inflow 2) | | |
| acrylic acid | 30 g | 30 g |
| methacrylic hydroxypropylester | 124 g | 124 g |
| methacrylic methylester | 6 g | 6 g |
| acrylic-n-butylester | 281 g | 281 g |
| VII. Monomer mixture (inflow 3) | | |
| acrylic-2-hydroxyethylester | 29.3 g | 58.5 g |
| acrylic-n-butylester | 386.8 g | 357.6 g |
| acrylic acid | 4.3 g | 4.3 g |
| VIII. Initiator solution (inflow 2) | | |
| ammonium peroxodisulfate | 1 g | 1 g |
| Emulsifier A (80%) | 10.7 g | 10.7 g |
| de-ionised water | 580 g | 580 g |
| IX. Initiator solution (re-activation) | | |
| ammonium peroxodisulfate | 0.5 g | 0.5 g |
| de-ionised water | 10 g | 10 g |
| X. Neutralisation solution | | |
| ammonia (25%) | 22 g | 27 g |
| de-ionised water | 20 g | 20 g |
| solids content (wt.-%) | 42.6 | 42.6 |
| pH value | 7.0 | 7.0 |
| viscosity at RT and D = 21.1 $s^{-1}$ (mPa · s) | 610 | 760 |
| average particle diameter (LKS) (nm) | 140 | 169 |
| acid-number (mg KOH/g Lff) | 10.8 | 12.1 |
| conductivity (mS/cm) | 5.84 | 5.84 |
| glass temperatures (according to DSC method) (° C.) | −37/114.5 | −29/113.5 |

EXAMPLES C AND D

In a 3-1 stirred-tank reactor with effective stirrer, reflux condenser as well as gas inlet and gas outlet the initial submissions I (cf. Table 2) are submitted and flushed with nitrogen. Subsequently nitrogen is passed over in a steady stream and the initial submission is heated to 80° C. with stirring at about 120 rpm. Subsequently the monomer mixtures II specified in Table 2 and the initiator solutions III are added very quickly. After a reaction time of 30 minutes the inflow of the monomer mixtures IV and of the initiator solutions V is started; IV is uniformly metered in in 2 h, V in 4 h. After the inflow of the monomer mixtures IV has been completed, the inflow of the monomer mixtures VI is begun; VI is uniformly metered in in 2 h. Subsequently the monomer mixtures VII and the initiator solutions VIII are uniformly metered in in 1 h. Then further stirring is effected for 1 h and re-activation is effected with IX. After this, further stirring is effected for 4 h and cooling to room temperature takes place. Neutralisation is effected with the solutions X. Subsequently the dispersions are filtered and drawn off.

The physicochemical characteristic data relating to the aqueous polymer dispersions are likewise listed in Table 2.

TABLE 2

| | C | D |
|---|---|---|
| I. Initial submission | | |
| Emulsifier A (80%) | 12.5 g | 12.5 g |
| de-ionised water | 700 g | 700 g |
| II. Monomer mixture (batch phase) | | |
| methacrylic hydroxypropylester | 8 g | 8 g |
| methacrylic methylester | 90 g | 90 g |
| III. Initiator solution (batch phase) | | |
| ammonium peroxodisulfate | 0.5 g | 0.5 g |
| de-ionised water | 25 g | 25 g |
| IV. Monomer mixture (inflow 1) | | |
| methacrylic hydroxypropylester | 37 g | 37 g |
| methacrylic methylester | 399 g | 404 g |
| dimeric α-methylstyrene (regulator) | 5 g | — |
| V. Initiator solution (inflow 1) | | |
| ammonium peroxodisulfate | 3 g | 3 g |
| Emulsifier A (80%) | 12.5 g | 12.5 g |
| de-ionised water | 600 g | 600 g |
| VI. Monomer mixture (inflow 2) | | |
| acrylic acid | 30 g | 30 g |
| methacrylic hydroxypropylester | 124 g | 124 g |
| methacrylic methylester | 1 g | 6 g |
| acrylic-n-butylester | 281 g | 281 g |
| dimeric α-methylstyrene (regulator) | 5 g | — |
| VII. Monomer mixture (inflow 3) | | |
| acrylic-2-hydroxyethylester | 58.5 g | 58.5 g |
| acrylic-n-butylester | 353.3 g | 357.6 g |
| acrylic acid | 4.3 g | 4.3 g |
| dimeric α-methylstyrene (regulator) | 4.3 g | — |
| VIII. Initiator solution (inflow 2) | | |
| ammonium peroxodisulfate | 1 g | 1 g |
| Emulsifier A (80%) | 10.7 g | 10.7 g |
| de-ionised water | 580 g | 580 g |
| IX. Initiator solution (re-activation) | | |
| ammonium peroxodisulfate | 0.5 g | 0.5 g |
| de-ionised water | 10 g | 10 g |
| X. Neutralisation solution | | |
| ammonia (25%) | 27 g | — |
| de-ionised water | 20 g | 30 g |
| N-dimethylaminoethanol | — | 34 g |
| solids content (wt.-%) | 41.7 | 42.1 |
| pH value | 7.2 | 7.4 |
| viscosity at RT and D = 42.2 $s^{-1}$ (mPa · s) | 420 | 800 |
| average particle diameter (LKS) (nm) | 113 | 119 |
| acid-number (mg KOH/g Lff) | 11.1 | 10.6 |
| conductivity (mS/cm) | 5.94 | 6.62 |
| glass temperatures (according to DSC method) (° C.) | −17.3/35.7 | — |

Production of Graft Polymers (Elastomer Components as Graft Base) in the One-pot Process

EXAMPLES E AND G

In a 3-1 stirred-tank reactor with effective stirrer, reflux condenser as well as gas inlet and gas outlet the initial submissions I (cf. Table 3) are submitted and flushed with nitrogen. Subsequently nitrogen is passed over in a steady stream and the initial submission is heated to 80° C. with stirring at about 120 rmp. Subsequently the monomer mixtures II and the initiator solution III specified in Table 3 are added quickly. After a reaction time of 30 minutes the inflow of the monomer mixtures IV and of the initiator/emulsifier solution V is started; they are uniformly metered in in 2 h. After this, further stirring is effected for 30 minutes and subsequently the monomer mixtures VI and the initiator/emulsifier solutions VII are uniformly metered in in 4 h. After this, further stirring is effected for 30 minutes and then re-activation is effected with the initiator solution VIII. Subsequently further stirring is effected for 4 h, cooling to room temperature takes place and neutralisation is effected with the solutions IX. Subsequently the dispersions are filtered and drawn off.

The physicochemical characteristic data relating to the aqueous polymer dispersions are likewise listed in Table 3.

TABLE 3

| | E | F | G |
|---|---|---|---|
| I. Initial submission | | | |
| Emulsifier A (80%) | 12.5 g | 12.5 g | 12.5 g |
| de-ionised water | 700 g | 700 g | 700 g |
| II. Monomer mixture (batch phase) | | | |
| methacrylic-2-hydroxyethylester | 7.6 g | 15.2 g | 15.2 g |
| acrylic-n-butylester | 89.4 g | 81.8 g | 81.8 g |
| acrylic acid | 1.0 g | 1.0 g | 1.0 g |
| III. Initiator solution (batch phase) | | | |
| ammonium peroxodisulfate | 0.5 g | 0.5 g | 0.5 g |
| de-ionised water | 25 g | 25 g | 25 g |
| IV. Monomer mixture (inflow 1) | | | |
| methacrylic-2-hydroxyethylester | 25.2 g | 50.3 g | 50.3 g |
| acrylic-n-butylester | 293.9 g | 268.8 g | 268.8 g |
| acrylic acid | 3.3 g | 3.3 g | 3.3 g |
| V. Initiator solution (inflow 1) | | | |
| ammonium peroxodisulfate | 1.0 g | 1.0 g | 1.0 g |
| Emulsifier A (80%) | 10.7 g | 10.7 g | 10.7 g |
| de-ionised water | 580 g | 580 g | 580 g |
| VI. Monomer mixture (inflow 2) | | | |
| methacrylic hydroxypropylester | 169 g | 169 g | 169 g |
| methacrylic methylester | 500 g | 500 g | 500 g |
| acrylic-n-butylester | 281 g | 281 g | 281 g |
| acrylic acid | 30 g | 30 g | 30 g |
| VII. Initiator solution (inflow 2) | | | |
| ammonium peroxodisulfate | 3 g | 3 g | 3 g |
| Emulsifier A (80%) | 12.5 g | 12.5 g | 12.5 g |
| de-ionised water | 600 g | 600 g | 600 g |
| VIII. Initiator solution (re-activation) | | | |
| ammonium peroxodisulfate | 0.5 g | 0.5 g | 0.5 g |
| de-ionised water | 10 g | 10 g | 10 g |
| IX. Neutralisation solution | | | |
| ammonia (25%) | 24 g | 24 g | — |
| de-ionised water | 20 g | 20 g | 30 g |
| N-dimethylaminoethanol | — | — | 31 g |
| solids content (wt.-%) | 41.4 | 42.0 | 42.0 |
| pH value | 7.5 | 7.7 | 7.7 |
| viscosity at RT and D = 42.2 $s^{-1}$ (mPa · s) | >100 | 380 | 690 |
| average particle diameter (LKS) (nm) | 98 | 99 | 98 |
| acid-number (mg KOH/g Lff) | 10.9 | 10.6 | 10.2 |
| conductivity (mS/cm) | 4.92 | 5.20 | 3.28 |
| glass temperatures (according to DSC method) (° C.) | −38.5/45.5 | −31.0/45.0 | — |

Polyisocyanate 1

1.0 gram equivalent of a polyisocyanate containing isocyanurate groups and based on 1,6-diisocyanatohexane (HDI) with an NCO content of 21.5%, an average NCO functionality of about 3.8 and a viscosity of 3,000 mPa·s (23° C.) are mixed at room temperature, with stirring, with 0.8 gram equivalent of a monofunctional polyethylene-oxide polyether started on methanol with an average molecular weight of 350 and subsequently heating is effected for 3 h to 100° C. After cooling to room temperature a practically colourless clear polyisocyanate mixture is present. The NCO content amounts to 17.3%, the content of ethylene-oxide units amounts to 11.3% and the viscosity amounts to 3,050 mPa·s (23° C.).

Polyisocyanate 2 (Free German Patent Application 19 822 891.0)

850 g (4.39 gram equivalent) of a polyisocyanate containing isocyanurate groups and based on 1,6-diisocyanatohexane (HDI) with an NCO content of 21.7%, an average NCO functionality of 3.5 (according to GPC), a content of monomeric HDI of 0.1% and a viscosity of 3,000 mPa·s (23° C.) are submitted at 100° C. under dry nitrogen and with stirring, are mixed within 30 minutes with 150 g (0.30 gram equivalent) of a monofunctional polyethylene-oxide polyether started on methanol with an average molecular weight of 500, corresponding to an NCO/OH equivalent ratio of 14.6:1, and subsequently stirred further at this temperature until the NCO content of the mixture has fallen after about 2 h to the value of 17.2%, corresponding to total urethanisation. The allophanatisation reaction is started by addition of 0.01 g zinc(II)-2-ethyl-1-hexanoate. In the process the temperature of the reaction mixture rises to 106° C. by reason of the heat of reaction that is released. After the exothermic reaction has died away, about 30 minutes after addition of catalyst, the reaction is terminated by addition of 0.01 g benzoyl chloride, and the reaction mixture is cooled to room temperature. A practically colourless, clear polyisocyanate mixture is present with the following characteristic data:

| | |
|---|---|
| Solids content: | 100% |
| NCO content: | 16.0% |
| NCO functionality: | 4.0 |
| Viscosity (23° C.): | 3,200 mPa · s |

Application Examples

EXAMPLES 1 AND 2

The parts by weight of the polyol dispersions A and B specified in Table 4 are diluted with the parts by weight of water specified in the Table and are then intensively mixed with the parts by weight of Polyisocyanate 1 specified in the Table (5 min with Ultra-Turrax). The equivalent ratio NCO:OH adjusted in this case amounts to 1.4.

Subsequently, films with dry-layer thicknesses from 100 to 130 $\mu$m are sprayed in blister-free manner and conditioned for 1 h at room temperature, for 0.5 h at 80° C. and for 16 h at 60° C. and also for 1 day in the standard climate. The tensile tests carried out on free lacquer films enable a prediction to be made with regard to the influence of a lacquer that has been applied to plastic on the toughness behaviour of the lacquered plastic part. This prediction is based on the following experience:

As a rule, the impact strength of plastics is impaired by a lacquering, because a crack in the lacquering can, by reason of its notch effect, trigger a fracture in the plastic part. This has the result that lacquered plastic parts exhibit a lower energy absorption in the biaxial impact penetration test according to DIN 53 443 than unlacquered plastics. Particularly at low temperatures, the crack-triggering effect of the lacquering can go so far that, as a result of the lacquering, a tough fracturing behaviour of the plastic changes abruptly into a brittle fracturing behaviour with low energy absorption.

Experience has shown that a ductile fracturing behaviour in the tensile test in respect of free lacquer films correlates with a slight impairment of the impact strength of plastics as a result of the corresponding lacquering. By way of measuring-number for a slight impairment of the impact strength of plastics, the elongation at tear of the free lacquer films has proved useful. The greater the elongation at tear of the free lacquer film, the slighter the impairment of the impact strength of plastics as a result of the corresponding lacquering.

Furthermore, dynamic mechanical tensile tests (DMA) were carried out on free lacquer films with respect to the glass-transition behaviour. On the basis of the maxima of the loss modulus E" as a function of the temperature, in each instance two glass transitions, and hence the biphase nature of the lacquers, were demonstrated.

The values of resistance to chemicals as well as the pendulum hardness values according to König were determined in respect of films on glass plates. The following results (cf. Table 4) were obtained:

TABLE 4

Application and physicochemical characteristic data relating to Examples 1 and 2 (NCO:OH = 1.4)

| | Example 1 | Example 2 |
|---|---|---|
| Parts by weight of Component A | 234.7 | — |
| Parts by weight of Component B | — | 234.7 |
| Parts by weight of water | 11 | 24 |
| Parts by weight of Polyisocyanate 1 | 14.6 | 17.2 |
| Pendulum hardness (acc. to König) [s] (for film-layer thickness [μm]) | 43/(127) | 46/(103) |
| Film haze*** | 1 | 1 |
| Glass temperatures (DMA measurements) | −33° C./ +42° C. | −26° C./ +39° C. |
| Resistance to tearing (RT) [MPa] (for film-layer thickness [μm]) | 22.0/(135) | 25.0/(116) |
| Elongation at tear (RT) [%] | 27.8 | 35.0 |
| Resistance to tearing (0° C.) [MPa] | 30.1 | 35.6 |
| Elongation at tear (0° C.) [%] | 15.4 | 17.4 |
| Resistance to tearing (−20° C.) [MPa] | 37.8 | 42.3 |
| Elongation at tear (−20° C.) [%]* | 9.3 | 7.1 |
| Tar-stain resistance after | | |
| 1 h | 1 | 0** |
| 3 h | 3 | 1 |
| 8 h | 3 | 2 |
| 24 h | 4 | 3 |

*a monophase copolymer dispersion (according to EP-A 358 979) based on acrylate hardened with an allophanatised polyisocyanate (according to EP-A 496 208 and EP-A 649 866) yields at −20° C. an elongation at tear of only 3.4% (Comparative System I)
**scale of marking:
0: very well resistant
5: not resistant
***scale of marking:
0: clear
5: very hazy

EXAMPLES 3 AND 4

The parts by weight of the polyol dispersions E and F specified in Table 5 are mixed intensively, as in Examples 1 and 2, with the parts by weight of water and Polyisocyanate 1 specified in Table 5 (5 min with Ultra-Turrax). The equivalent ratio NCO:OH adjusted in this case amounts to 1.4.

Subsequently, films with dry-layer thicknesses from 80 to 110 μm are sprayed in blister-free manner and conditioned for 1 h at room temperature, for 0.5 h at 80° C. and for 16 h at 60° C. and also for 1 day in the standard climate. The tensile tests carried out on free lacquer films enable a prediction to be made with regard to the influence of a lacquer that has been applied to plastic on the toughness behaviour of the lacquered plastic part (for an explanation, see Examples 1 and 2).

Furthermore, dynamic mechanical tensile tests (DMA) were carried out on free lacquer films with respect to the glass-transition behaviour. On the basis of the maxima of the loss modulus E" as a function of the temperature, in each instance two glass transitions, and hence the biphase nature of the lacquers, were demonstrated.

The values of resistance to chemicals as well as the pendulum hardness values according to König were determined in respect of films on glass plates. The following results (cf. Table 5) were obtained:

TABLE 5

Application and physicochemical characteristic data relating to Examples 3 and 4 (NCO:OH = 1.4)

| | Example 3 | Example 4 |
|---|---|---|
| Parts by weight of Component E | 100 | — |
| Parts by weight of Component F | — | 100 |
| Parts by weight of water | 10.0 | 22.2 |
| Parts by weight of Polyisocyanate 1 (75 wt.-% in methoxypropyl acetate) | 18.9 | 23.2 |
| Pendulum hardness (acc. to König) [s] (for film-layer thickness [μm]) | 101 (95) | 108 (85) |
| Film haze* | 2 | 1 |
| Blisters in the film* | 1 | 1 |
| Glass temperatures (DMA measurements) | −36° C./ +42.4° C. | −20.9° C./ +48.6° C. |
| Resistance to tearing (−20° C.) [N/mm$^2$] | 53.6 | 56.3 |
| Elongation at tear (−20° C.) [%] | 8.4 | 7.7 |
| Tar-stain resistance** after | | |
| 1 h | 0 | 0 |
| 3 h | 0 | 0 |
| 8 h | 0–1 | 1 |
| 24 h | 1 | 1 |

*Scale of marking:
0: very clear
5: very hazy
**Scale of marking:
0: very well resistant
5: not resistant

What is claimed is:

1. A two-component polyurethane coating composition containing a binder which comprises a) an aqueous solution and/or dispersion of a graft polymer prepared from at least two polyol components by covalently or adsorptively linking an elastomeric component a1) with a thermoplastic component a2), wherein the graft polymer contains hydroxyl groups and also sulfonate and/or carboxylate groups and components a1) and a2), are prepared from olefinically unsaturated monomers, and b) a polyisocyanate component, which has a viscosity of at the most 10,000 mPa·s, contains at least one organic polyisocyanate and is emulsified or solubilized in aqueous component a), wherein components a) and b) are present at an NCO/OH equivalent ratio of 0.2:1 to 5:1.

2. The composition of claim 1 wherein the graft polymer is a core/shell polymer wherein thermoplastic component a2) is the core and elastomeric component a1) is the shell.

3. The composition of claim 1 wherein the graft polymer is a core/shell polymer wherein elastomer component a1) is the core and thermoplastic component a2) is the shell.

4. The composition of claim 1 wherein the graft polymer comprises a polymer containing carboxylate groups and optionally carboxyl groups.

5. The composition of claim 1 wherein the graft polymer is formed from an elastomer phase a1) and a thermoplastic phase a2).

6. The composition of claim 1 wherein elastomeric component a1) has a hydroxyl number of 8 to 264 mg KOH/g solid resin, an acid number, based on the total amount of non-neutralized and neutralized acid groups, of 0 to 100 mg KOH/g solid resin and a glass temperature of at most 0° C.

7. The composition of claim 1 wherein thermoplastic component a2) has a hydroxyl number of 16 to 264 mg KOH/g solid resin, an acid number, based on the total amount non-neutralized and neutralized acid groups, of 3 to 100 mg KOH/g solid resin and a glass temperature of at least 0° C.

8. The composition of claim 1 wherein component b) comprises a hydrophilic polyisocyanate.

9. The composition of claim 1 wherein component b) is rendered hydrophilic with a monofunctional polyether prepared from ethylene oxide and/or a monofunctional compound having an acid group.

10. A process for the production of a two-component polyurethane coating agent according to claim 1 comprising emulsifying or solubilizing polyisocyanate component b) in aqueous graft polymer a).

11. A substrate coated with the two-component polyurethane coating composition of claim 1.

* * * * *